APPARATUS FOR RECORDING AND READING OUT DATA PULSES

Filed Sept. 15, 1961 3 Sheets-Sheet 1

INVENTOR
D.H.LIEN
BY J. J. Landis
ATTORNEY

APPARATUS FOR RECORDING AND READING OUT DATA PULSES

Filed Sept. 15, 1961 3 Sheets-Sheet 2

INVENTOR
D.H. LIEN
BY J. L. Landis
ATTORNEY

APPARATUS FOR RECORDING AND READING OUT DATA PULSES

Filed Sept. 15, 1961 3 Sheets-Sheet 3

INVENTOR
D. H. LIEN
BY J. J. Landis
ATTORNEY

United States Patent Office 3,217,103

Patented Nov. 9, 1965

3,217,103

APPARATUS FOR RECORDING AND READING OUT DATA PULSES

Dallas H. Lien, Indianapolis, Ind., assignor to Western Electric Company, Incorporated, a corporation of New York Filed Sept. 15, 1961, Ser. No. 138,507
12 Claims. (Cl. 179—1)

The present invention relates to methods of and apparatus for recording and reading out data pulses and more specifically to the utilization of such methods and apparatus to store analog data pulses in a stationary magnetic recorder wire and to read out the stored data pulses in any desired order and at any predetermined frequency such as to produce composite intelligence signals. Accordingly, objects of this invention are to provide new and improved methods and apparatus of such character.

Other objects of this invention are to provide new and improved methods and apparatus for synthesizing sounds.

Additional objects of this invention are to provide new and improved methods and apparatus for synthesizing human speech.

A further object of this invention is to provide improved apparatus for storing analog data pulses in a stationary magnetic recorder wire at spaced independent positions along the length thereof.

A still further object of this invention is to provide improved apparatus for selectively reading out in any desired order analog data pulses which have been stored in a stationary magnetic recorder wire at spaced independent positions along the length thereof.

Another object of this invention is to provide improved apparatus for selectively storing analog data pulses in a stationary magnetic recorder wire at spaced independent positions along the length thereof and for subsequently selectively reading out analog data pulses therefrom in any desired order without significantly altering the stored analog data pulses.

A further object of the invention is to provide new and improved apparatus for inducing localized magnetic flux change pulses in various specific regions along the length of a stationary magnetic wire.

With these and other objects in mind, the present invention relates, in part, to methods of producing composite intelligence signals from distinctive individual stored analog data pulses. A method utilizing the principles of the invention may include the steps of storing a set of analog data pulses in spaced independent sections along the length of a stationary magnetic recorder wire and subsequently reading out selected ones of the stored analog data pulses in predetermined orders and at predetermined frequencies designed to produce desired composite intelligence signals. More specifically, this invention relates, in part, to a method of synthesizing desired sounds, especially human speech, from the distinctive individual stored analog data pulses.

The present invention also relates, in part, to apparatus for selectively storing data pulses in a stationary magnetic recorder wire in spaced independent sections along the length thereof. A magnetic selector wire is disposed in parallel relationship with respect to the recorder wire, and the selector wire is divided into various magnetically independent regions which are electromagnetically coupled with corresponding ones of the sections along the recorder wire wherein data pulses are to be stored. Magnetic flux change pulses representative of data pulses to be stored are induced in the selector wire at succeeding regions therealong, which cause flux change pulses to be induced in the recorder wire at corresponding sections therealong so that the recorder wire is driven to states of magnetization representative of the data pulses at the corresponding sections.

Further, the present invention relates, in part, to apparatus for selectively reading out data pulses which have been stored in a stationary magnetic recorder wire at spaced independent sections along the length thereof. A single pickup winding is wound about the recorder wire along the length thereof, and localized magnetic flux change pulses are induced in the recorder wire at selected ones of the spaced sections wherein data pulses are stored so that sequential output pulses representative of the selected data pulses are electromagnetically induced in the pickup winding.

This invention, together with other objects, advantages, and aspects thereof, will become apparent by reference to the following detailed description thereof and the accompanying drawings illustrating preferred embodiments thereof, in which.

Figures 1, 2:
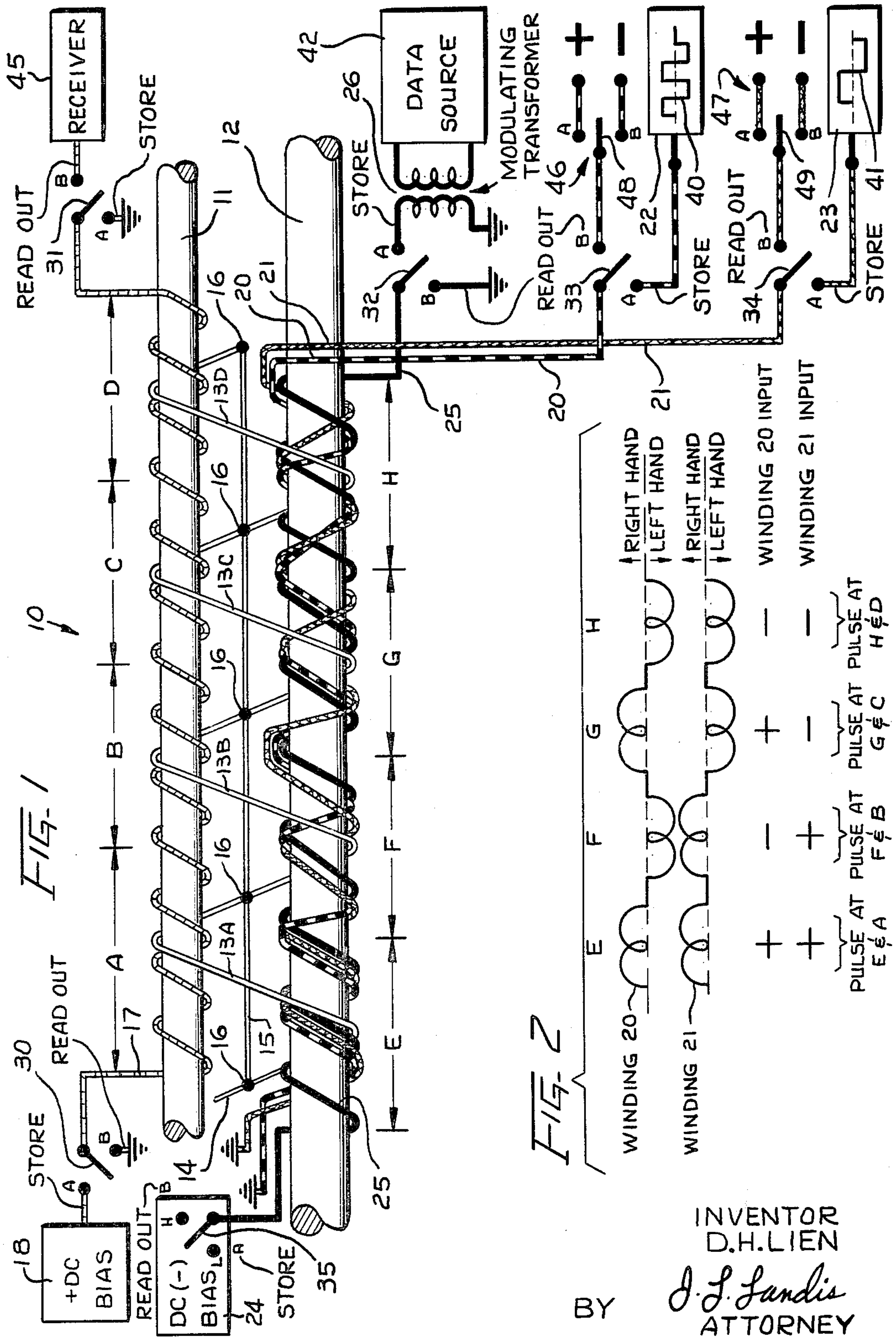
FIG. 1 is an enlarged view of a simplified stationary wire recorder illustrating a preferred form of the invention.
FIG. 2 is a detached schematic view illustrating a winding pattern, in accordance with a first embodiment of the invention, of a pair of control windings for controlling the recordng and read out operations of the wire recorder illustrated in FIG. 1.

Referring now in detail to the drawings and more specifically to FIG. 1, a simplified form of a wire recorder 10 is illustrated in accordance with a first embodiment of the invention. The recorder 10 may be used either (1) to store analog data pulses in a stationary magnetic recorder wire 11 at spaced independent sections along the length thereof, four such sections being represented by the letters A, B, C, and D, or (2) to read out in any desired order such analog data pulses which have been stored in the recorder wire in accordance with the data storing process of the invention. For brevity, *analog data pulses* will be referred to as "ANDAPs" in the following description of the invention. The manner in which the recorder 10 functions as an apparatus for storing ANDAPs will first be described, and then the manner in which the recorder 10 functions as an apparatus for reading out ANDAPs will be described under the heading "DATA READ OUT."

The term magnetic wire as used in the following description is intended to include any suitable magnetic medium formed as a wire or strand.

DATA STORING

The recorder 10 includes a magnetic selector wire 12 which is disposed in parallel relationship with respect to the recorder wire 11. Four specific regions, identified by the letters E, F, G, and H, are defined along the length of the selector wire 12, and these regions correspond respectively to the four specific sections A, B, C, and D along the recorder wire 11 wherein ANDAPs are to be stored.

The selector wire 12 is composed of a "soft" ferromagnetic material, such as transformer iron, which has a high permeability and the recorder wire 11 is composed of a "hard," more retentive ferromagnetic material, such as Vicalloy–2 (52% cobalt, 14% vanadium, and 34% iron), which has a high coercive force.

A group of four electrically independent linking or input windings 13A, 13B, 13C, and 13D are wound about the recorder wire 11 and the selector wire 12 at spaced intervals along the length of both wires, and these linking windings divide the recorder wire and the selector wire into the corresponding sections (A through D) and regions (E through H) so that each of the regions is electromagnetically and independently coupled to the corresponding one of the sections. In the illustrated example, a single linking conductor 14 is wound about the recorder wire and the selector wire along the length of both wires, and a shorting wire 15 is connected to the linking conductor 14 at spaced intervals 16—16 along the length thereof to define the four independent linking windings 13A, 13B, 13C and 13D.

With this arrangement, a localized magnetic flux change pulse is induced in the recorder wire 11 at any selected one of the sections (A through D) therealong when a current pulse is induced in the associated one of the linking windings (13A through 13D). A current pulse is induced in any given one of the linking windings when a localized magnetic flux change pulse is induced in the associated one of the regions (E through H) of the selector wire 12. When a flux change pulse is induced in the recorder wire 11 at a section therealong, the recorder wire is driven to a new state of magnetization representative of an ANDAP to be stored at that section.

A single pickup winding 17 is wound about the recorder wire 11 along the length thereof, and a positive biasing potential from a D.C. source 18 is applied thereto during data storing to bias the recorder wire so as to negate the effect of the negative portions of the current pulses induced in the linking windings 13A through 13D. The flux change pulses induced in the recorder wire 11 are dependent on the changes in currents induced in the linking windings; therefore, as the current in one of the linking windings rises from zero to a value determined by a flux change pulse induced in the associated region of the selector wire 12, a flux change pulse is induced in the recorder wire 11 at the associated section which drives the recorder wire to a new state of magnetization at that section. As the current in the linking winding decreases from the value determined by the flux change pulse induced in the selector wire to zero, a flux change pulse would be induced in the recorder wire at the associated section which would drive the recorder wire back to the original state of magnetization at that section if the positive biasing potential were not applied to the pickup winding 11.

In order to provide for the independent storing of the ANDAPs, a plurality of electrically independent control windings are wound about the selector wire 12 along the length thereof. Two such control windings 20 and 21 are shown in the simplified illustrated example, and four independent ANDAPs may be stored when only two control windings are utilized. These control windings are illustrated in detached side-by-side relation in FIG. 2, so that the operation of the invention may be depicted more clearly. As illustrated, the control windings 20 and 21 have periodic reversals in the direction of winding which divide the control windings into specific regions 20E through 20H and 21E through 21H which correspond with the regions E through H along the selector wire 12.

In accordance with a first embodiment of the invention illustrated in FIGS. 1 and 2, the reversal intervals of the control windings 20 and 21 are in a binary winding pattern such that a first control winding (the winding 20) is provided with a reversal interval that corresponds with the spacing of the independent regions E through H along the selector wire 12: that is, the region 20E is wound in a right-hand helix which will be designated arbitrarily as the positive direction; the region 20F is wound in a left-hand helix which will be designated arbitrarily as the negative direction; the regian 20G is a right-hand or positive helix; and the final region 20H is a left-hand or negative helix. The second control winding 21 is provided with a reversal interval which is double that of the first control winding 20. Thus in the illustrated example, the regions 21E and 21F are right-hand or positive helices and the regions 21G and 21H are in left-hand or negative helices.

In the event that between five and eight ANDAPs are to be stored, the pattern of the control windings 20 and 21 will be repeated as they appear in FIG. 2 out to eight distant regions, and a third control winding will be provided having a reversal interval double that of the second control winding 21. Thus, for each additional control winding added, the number of ANDAPs that may be stored is doubled.

A pair of square wave generators 22 and 23 are preferably provided for applying square wave signals, consisting of positive and negative pulses of equal amplitude, to the two control windings 20 and 21 utilized in the illustrative embodiment of the invention. The square wave inputs to the control windings are in binary frequency pattern such that the square wave input applied to the first control winding 20 is of the highest frequency and the square wave input applied to the second control winding 21 is of a frequency which is one-half the frequency of the input applied to the first control winding. In the event that more control windings are provided, so that more than four ANDAPs may be stored, the input square wave applied to each subsequent control winding added will have a frequency which is one-half the frequency of the input applied to the next preceding control winding.

The selector wire 12 is negatively biased beyond magnetic saturation by applying a negative D.C. bias signal from a source 24 to a bias winding 25 which is wound about the selector wire along the length thereof. With this arrangement, any given region (E through H) of the selector wire 12 can be driven out of saturation and have a magnetic flux change pulse induced therein only when the regions of both of the control windings 20 and 21 (all the control windings when more than two control windings are utilized) associated with this region of the selector wire are simultaneously positive in sense. A region of each control winding is "positive in sense" either (1) when a positive signal is applied to the control winding and the region is a right-hand or positive helix, or (2) when a negative signal is applied to the control winding and the region is a left-hand or negative helix.

Thus, because of the binary winding pattern established between the control windings 20 and 21, only those regions of the two control windings which are associated with a selected one of the regions of the selector wire are simultaneously positive in sense for any combination of positive and negative inputs to the control windings. Therefore, only one of the regions of the selector wire is driven out of saturation and has a magnetic flux change pulse induced therein for each possible combination of the positive and negative inputs to the control windings.

In the illustrated embodiment of the invention, a modulating transformer 26 is connected to the bias winding 25 during data storing so that the amplitude of the negative bias applied to the bias winding may be modulated in accordance with the amplitude of the ANDAPs to be stored. Thus, the magnitude of the flux change pulse induced in the selector wire at any region therealong may be modulated since the amplitude of the flux change pulse depends on the differential between the negative effect of the bias applied to the bias winding and the positive effect of the inputs applied to the control windings when their effects are all positive in sense, the positive effect of the control windings being of a constant amplitude. Tht amplitude of the negative bias is modulated in timed relation with the square wave input applied to the first control winding 20 so that the amplitudes of the flux change pulses induced in the various regions of the reader wire vary in accordance with the amplitudes of the various ANDAPs to be stored.

Other apparatus may be substituted for the modulating transformer, or the bias applied to the bias winding may be maintained at a constant value and the amplitude of any or all the inputs to the control windings may be modulated, in accordance with the amplitude of the ANDAPs to be stored, to provide for modulation of the flux change pulses induced in the selector wire.

In the data storing operation of the illustrated embodiment of the invention, double-pole single-throw switches 30 through 35 are thrown to their "store" contacts 30A through 35A to condition the recorder 10 for the storing operation by (1) connecting the positive D.C. bias 18 to one end of the pickup winding 17 and connecting the other end to ground, (2) connecting the modulating transformer 26 to one end of the bias winding 25 and connecting a low negative D.C. bias of the source 24 to the other end of that winding, and (3) connecting the square wave generators 22 and 23 to the control windings 20 and 21.

Figure 3:
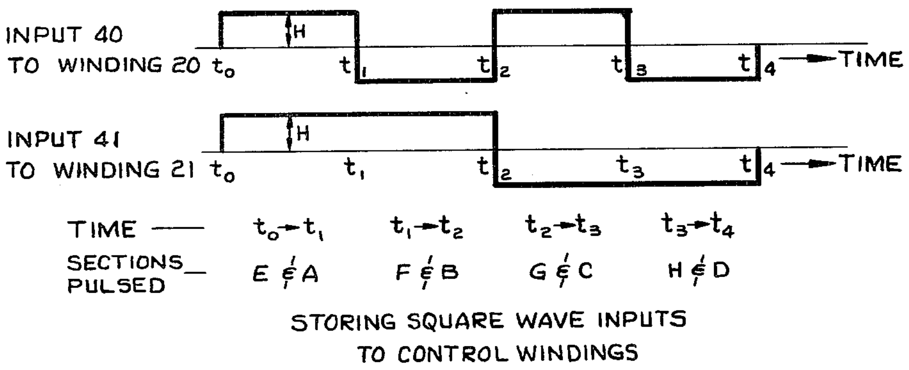
FIG. 3 illustrates a pair of inputs to the control windings of FIG. 2 during a recording operation.

When the square wave generators 22 and 23 are actuated, the square waves 40 and 41 illustrated in side-by-side relation in FIG. 3 are applied to the control windings 20 and 21 respectively, and the modulating transformer 26 is actuated from a data source 42 in sychronism with the square wave generators so that the bias applied to the bias winding 25 is modulated in accordance with the amplitudes of the ANDAPs to be stored and in timed relation with the square wave 40 applied to the control winding 20.

From time $t_0$ to $t_1$ depicted in FIG. 3, the negative bias on the bias winding 25 corresponds to the amplitude of the first ANDAP to be stored, and the square wave inputs 40 and 31 to the control windings 20 and 21 are both positive. The regions 20E and 21E of the control windings are simultaneously positive in sense during this time period, since the regions are right-hand helices and the control winding inputs are positive. Thus, the selector wire 12 is driven out of saturation and has a magnetic flux change pulse representative of the first ANDAP to be stored induced therein at the region E, since the effect of the modulated negative D.C. bias is overcome at this region by the cumulative positive effect of the inputs to the control windings. The flux change pulse induced in the region E of the selector wire induces a current pulse in the linking winding 13A, which in turn induces a magnetic flux change pulse in the recorder wire 11 at the associated section A so that the recorder wire is driven to a state of magnetization representative of the first ANDAP at this section.

The positive D.C. bias 18 applied to the pickup winding 17 negates the effect of the negative portion (or tail) of the current pulse induced in the linking winding 13A so that the recorder wire 11 is not driven back to its original state of magnetization at section A, thus preventing erasure of the ANDAP just stored.

The bias is not overcome at regions F, G, and H of the selector wire 12 from time $t_0$ to $t_1$, since the associated control winding regions are not both positive in sense at these regions; that is, regions 20F, 21G, and 21H are left-hand regions and, since the signals applied to the control windings 20 and 21 are positive, the control windings are not both positive in sense at these regions, which is the necessary condition to overcome the negative bias effect of the bias winding 25.

From time $t_1$ to $t_2$, the negative bias on the bias winding 25 is modulated in accordance with the amplitude of the second ANDAP to be stored in section B of the recorder wire, and the control windings 20 and 21 are positive in sense at the region F of the selector wire 12, since the input to the control winding 20 is negative and the winding is a left-hand helix at the region F and since the input to the control winding 21 is positive and the winding is a right-hand helix. Therefore, from time $t_1$ to $t_2$, the negative bias is overcome at this region F along the selector wire and a flux change pulse is induced therein at this region, so that a current pulse is induced in the linking winding 13B which induces a storing flux change pulse in the recorder wire 11 at the section B. As a result, at section B only, the recorder wire 11 is driven to a state of magnetization representative of the second ANDAP to be stored.

From time $t_2$ to $t_3$, the negative bias on the bias on the bias winding 25 is modulated in accordance with the amplitude of a third ANDAP to be stored and the control windings 20 and 21 are simultaneously positive in sense at the region G of the selector wire 12, since the input to the control winding 20 is positive and the winding is a right-hand helix at the region G and the input to control winding 21 negative and the winding is a left-hand helix at the region G. Therefore, from time $t_2$ to $t_3$, the negative bias is overcome at the region G along the selector wire and a flux change pulse is induced therein at this region, so that a current pulse is induced in the associated linking winding 13C which induces a storing flux change pulse in the recorder wire at the section C. As a result, at section C only, the recorder wire 11 is driven to a state of magnetization representative of the third ANDAP to be stored.

From time $t_3$ to $t_4$, the negative bias on the bias winding 25 is modulated in accordance with the amplitude of a fourth ANDAP to be stored and the control windings 20 and 21 are positive in sense at the region H of the selector wire 12, since the inputs to the control windings 20 and 21 are negative and the windings are left-hand helices at region H. Therefore, from time $t_3$ to $t_4$, the negative bias is overcome at the region H along the selector wire and a flux change pulse is induced therein at this region, so that a current pulse is induced in the associated linking winding 13D which induces a storing flux change pulse in the recorder wire at section D. As a result, at the section D only, the recorder wire 11 is driven to a state of magnetization representative of the fourth ANDAP to be stored.

As has been set forth in the foregoing description, four different ANDPAs have been stored independently and sequentially in the recorder wire at the spaced independent sections A, B, C, and D, which may be read out in any desired order as described below. It should be noted that if more control windings are added and lower frequency square waves are applied thereto as discussed above, more ANDAP may be independently and sequentially stored in the recorder wire 11 at succeeding sections therealong.

DATA READ OUT

When previously stored ANDAPs are to be read out, the double-pole single-throw switches 30 through 35 are thrown to the read out contacts 30B through 35B to condition the recorder 10 for read out by (1) disconnecting the positive D.C. bias 18 from the pickup winding 17 and by connecting one end of the winding 17 to a read out receiver 45 and the other end of that winding to ground, (2) disconnecting the low negative D.C. bias of the source 24 and the modulating transformer 26 from the bias winding 25 and applying a high negative D.C. bias from the source 24 through that winding to ground, and (3) disconnecting the square wave generators 22 and 23 from the control windings 20 and 21 and connecting switching sources 46 and 47 of positive and negative signals of equal magnitude thereto.

With this arrangement, a localized magnetic flux change pulse may be induced in the recorder wire 11 at any selected one of the sections A through D therealong, which induces in the pickup winding 17 at the pulsed section an output pulse representative of the stored ANDAP, when a current pulse is induced in the associated one of the linking windings 13A through 13D. A current pulse is induced in one of the linking windings 13A through 13D when a localized magnetic flux change pulse is induced in the associated one of the regions E through H of the selector wire 12.

The high negative bias applied to the bias winding 25 causes the flux change pulses induced in the selector wire 12 to have small amplitudes, since the amplitude of each flux change pulse is determined by the differential between the negative effect of the negative bias on the bias winding 25 and the cumulative positive effect of the inputs to the control windings 20 and 21 when they are both positive in sense. The current pulses induced in the linking windings, and thus the flux change pulses induced in the recorder wire, are also small in amplitude so that the previously stored ANDAPs are not altered by the flux change pulses induced in the recorder wire.

When small flux change pulses are induced in the recorder wire at the sections therealong having stored ANDAPs, output current pulses are induced in the pickup winding 17 having amplitudes dependent on the states of magnetization of the recorder wire at the sections from which they are induced. These output pulses thus have comparative amplitudes which correspond to the comparative amplitudes of the ANDAPs stored in the recorder wire.

Figure 4:
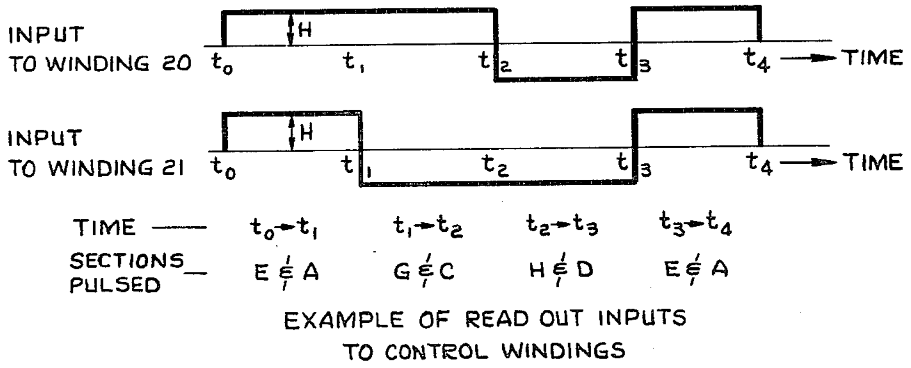
FIG. 4 illustrates a pair of typical inputs to the control windings of FIG. 2 during a read out operation.

As an example of the above-discussed read out operation, assume ANDAPs are to be read out in a predetermined sequence from the sections A, C, D, and A along the recorder wire 11. The inputs to the control windings 20 and 21 necessary to read out the ANDAPs in this specific order are illustrated in FIG. 4.

To read out the ANDAP from the recorder wire 11 at section A, switches 48 and 49 of the switching sources 46 and 47 are thrown to their positive contacts 48A and 49A, from time $t_0$ to $t_1$, so that positive signals are applied to both control windings 20 and 21. As previously discussed in the foregoing description of the storing operation, a flux change pulse is induced in the recorder wire 11 at the section A only, when positive input signals are applied to both control windings, which induces in the pickup winding 17 an output current pulse representative of the ANDAP stored in the recorder wire at section A.

To read out the ANDAP from the recorder wire 11 at section C, the switch 48 is maintained at its positive contact 48A and the switch 49 is thrown to its negative contact 49B, from time $t_1$ to $t_2$, so that a positive signal is applied to the control winding 20 and a negative signal is applied to the control winding 21. As a result, a flux change pulse is induced in the recorder wire at section C only which induces in the pickup winding 17 an output current pulse representative of the ANDAP stored in the recorder wire at position C.

Subsequently, to read out the ANDAP from the recorder wire 11 at section D, the switch 48 is thrown to its negative contact 48B and the switch 49 is maintained at its negative contact 49B, from time $t_2$ to $t_3$, so that negative signals are applied to both control windings 20 and 21. As a result, a flux change pulse is induced in the recorder wire at section D which induces in the pickup winding 17 an output current pulse representative of the ANDAP stored in the recorder wire at section D. Finally, the ANDAP stored in the recorder wire 11 at section A is read out, from time $t_3$ to $t_4$, as it was from $t_0$ to $t_1$.

In this manner, the stored ANDAPs may be read out in any desired order. The read out inputs to the control windings 20 and 21 may be regulated at any desired frequency, by switching the switches 48 and 49 at a desired frequency, so that stored ANDAPs may be read out at any desired frequency with this recorder.

The illustrated simple switching sources 46 and 47 may be replaced by various other devices of a more complex nature which may be utilized to regulate the application of input signals to the control windings, such as a modified Teletypewriter keyboard, a modified punched tape or card apparatus used in computers and business machines, electronic binary counters, square wave generators, or shift registers.

In accordance with the above-described operations, selected ones of the individually stored ANDAPs may be read out in any predetermined order and at any predetermined frequency so that any desired composite intelligence signals may be produced. Further, the ANDAPs stored in the recorder wire may be representative of individual, discrete sound fragments necessary to form spoken words. By reading out these ANDAPs in a predetermined order and at a predetermined frequency, an audio frequency envelope is defined from which a desired sequence of intelligible spoken words may be produced.

In the utilization of the above-described apparauts in speech synthesis, ANDAPs required to produce the different sounds necessary for the synthesization of human speech may be sequentially stored in different sections of the recorder wire. Approximately 56 individual sounds are needed to reproduce English spoken words, and several thousand ANDAPs may have to be sequentially stored for each sound.

Figure 5:
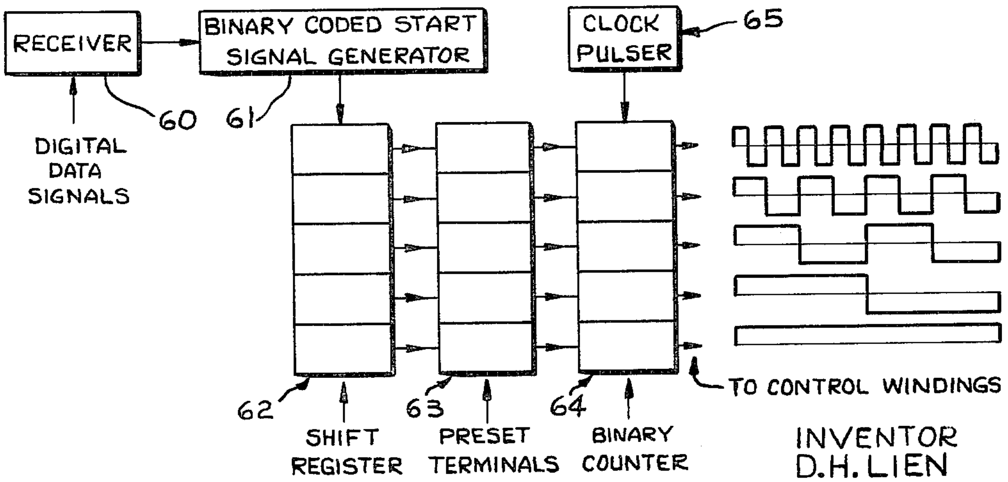
FIG. 5 is a schematic block diagram of a circuit for controlling the sequential reading out of stored analog data pulses from various sections of a recorder wire so that various sounds may be produced from the data pulses.

A circuit such as that illustrated in block form in FIG. 5 may be utilized in the reading out of ANDAPs for speech synthesis wherein the ANDAPs for the various sounds are sequentially stored in different sections of the recorder wire. In this circuit, a binary coded start signal is transmitted from a binary coded start signal generator 61 to a shift register 62 which preserves the transmitted data bit arrangement and transmits the data bits to preset terminals 63 to cause presetting of a binary counter 64. Pulses are then transmitted from a clock pulser 65 to the binary counter 64 to cause square wave inputs to be transmitted to the binary control windings so that reading out begins at a selected position along the recorder wire which corresponds to the beginning of a section of the recorder wire wherein the ANDAPs of a desired sound are sequentially stored. The ANDAPs are sequentially read out until the desired sound wave is formed and then a new binary coded start signal is transmitted to the shift register 62 so that the sound wave of the next desired sound is formed. The receiver 45 (FIG. 1) produces the desired sounds from the sound waves which are transmitted thereto.

Digital data signals may be transmitted over a transmission line to a receiver 60 which operates the binary coded start signal generator to cause the ANDAPs of various sounds to be read out in a prescribed sequence so that the desired spoken words may be synthesized therefrom. The bandwidth required to transmit the digital data signals over a transmission line is much less than that required to transmit the spoken words since the number of digital data signals required to operate the binary coded start signal generator is much less than the number of ANDAPs required to synthesize the desired sounds.

As an alternate method in speech synthesis, a prescribed plurality of ANDAPs having various amplitudes required for the synthesization of all the sounds necessary to reproduce English spoken words could be stored in the recorder wire. The ANDAPs could then be read out in the required sequence and at the required frequency to produce the desired sound waves by applying various combinations of square wave inputs to the binary control windings. Approximately 16 ANDAPs having various amplitudes would be sufficient for producing the necessary audio frequency envelopes from which any English spoken words may be reproduced. However, with only 16 ANDAPs available, the pulsing network for transmitting square wave inputs to the control windings would be much more complicated than that required when the ANDAPs for the various sounds are sequentially stored in different sections of the recorder wire and a greater number of digital data signals would be required so that a greater transmitting bandwidth would be required.

The embodiment of the invention described above may now be seen to provide an apparatus wherein a binary stepping arrangement of control windings is substituted for moving a recorder wire past a recording and pickup head as is done in present commercial recording equipment. With this arrangement, a wire recorder is provided which has no moving parts and which is simple and economical to manufacture. Also, the subject apparatus permits stored data pulses to be read out in any desired order whereas the data pulses must be read out in a single predetermined sequence with recording apparatus wherein a recorder wire moves past a pickup head. The methods of and apparatus for recording and reading out ANDAPs, as provided in the invention, readily lend themselves to utilization in producing composite intelligence signals and more specifically to utilization in synthesizing sounds and human speech.

ALTERNATE CONTROL WINDING EMBODIMENT

A sinusoidal control winding pattern and sinusoidal generators (see FIG. 6) may be substituted for the binary control winding pattern and the square wave generators illustrated in FIG. 1 to provide for the sequential pulsing of the selector wire sections.

Similar to the binary control windings, the sinusoidal control windings are wound about the selector wire 12 and have periodic reversals in the direction of winding that divide the control windings into specific regions which correspond to the regions along the selector wire 12. The winding directions and reversal intervals of the various control windings vary in accordance with a sinusoidal winding pattern such that a first pair of control windings 70 is provided with a reversal interval which corresponds with one-half the length of the selector wire and such that each subsequent pair of control windings is provided with a reversal interval which is one-third that of the next preceding control winding. The binary pattern is comprised of a plurality of windings whereas the sinusoidal pattern is comprised of a plurality of pairs of sinusoidal windings wherein each pair includes a winding wound in a cosine pattern 74, 76, and 78 and a winding wound in sine pattern 73, 75, and 77. Three pairs of control windings 70–72 are illustrated in FIG. 6 as utilized with a recording apparatus having a length L and six sinusoidal input generators 80–85 are illustrated for applying input control signals to the six control windings 73–78.

Figure 6:
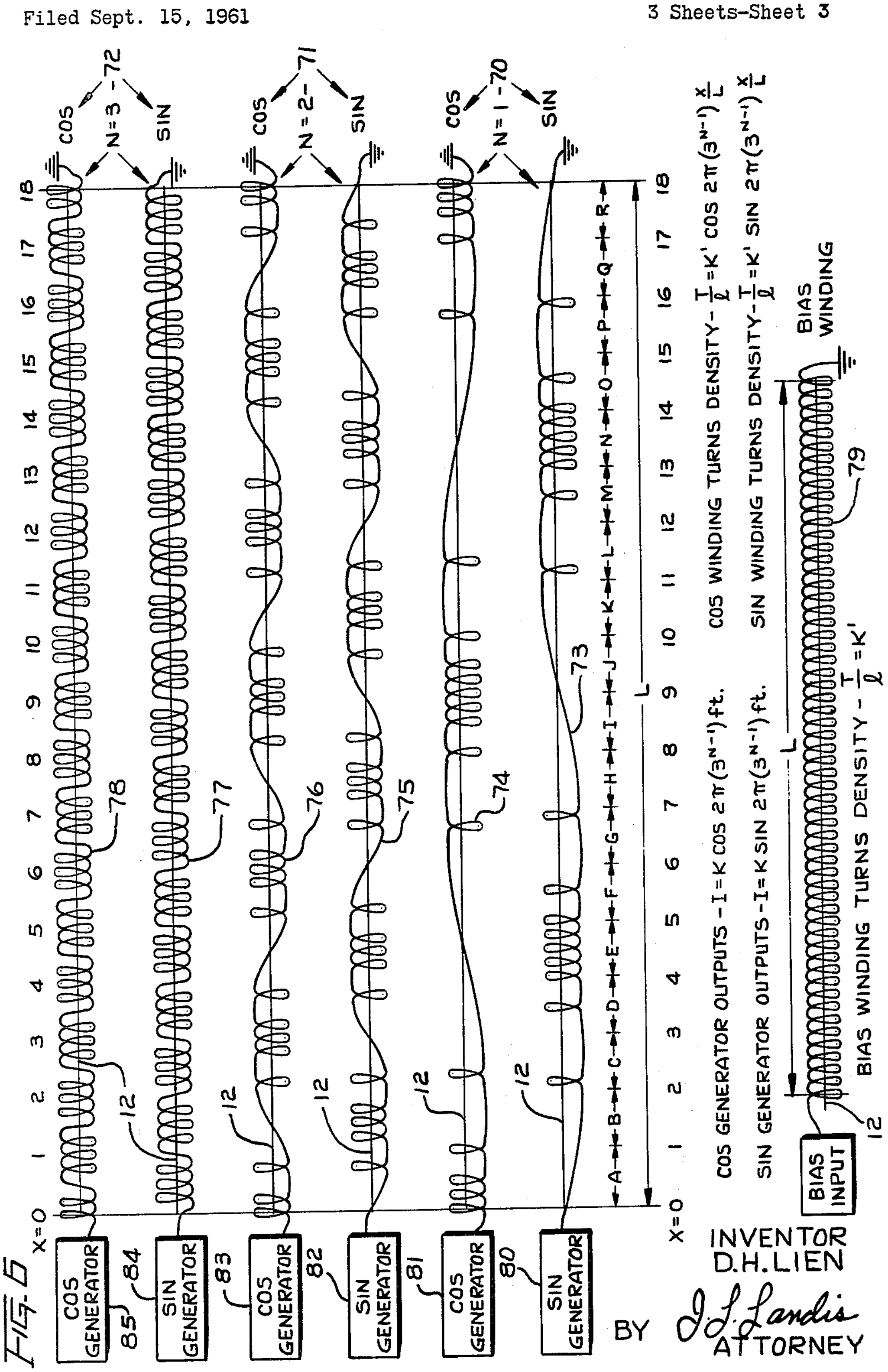
FIG. 6 illustrates an alternate control winding embodiment wherein a plurality of pairs of sinusoidal control windings are utilized.

The sinusoidal control windings are illustrated, in FIG. 6, having a turns density (turns per unit length) equal to $$K' \cos 2\pi(3^{N-1})\frac{X}{L}$$

for each cosine winding and equal to $$K' \sin 2\pi(3^{N-1})\frac{X}{L}$$

for each sine winding, and the inputs to the control windings are equal to $K \cos 2\pi(3^{N-1})ft$ for each cosine winding and are equal to $K \sin 2\pi(3^{N-1})ft$ for each sine winding, wherein K' and K are constants, N is the number of the particular control winding pair (that is, for the first pair 70, $N=1$, etc.), X is the distance along the selector wire, L is total length of the selector wire, $f$ is frequency, and $t$ is time.

A bias winding 79 is also illustrated in FIG. 6, which is wound about the selector wire 12 and which has a turns density of K' wherein K' is a constant. During the reading out of ANDAPs, an input signal is applied to the bias winding which is equal to KN' wherein K is a constant and N' is the number of sinusoidal pairs so that the selector wire 12 is negatively biased beyond magnetic saturation. During the storing of ANDAPs, the bias input is modulated in accordance with the amplitude of the ANDAP to be stored so that the amount that the selector wire is biased beyond magnetic saturation is modulated.

With the illustrated sinusoidal control windings and control winding inputs, the bias winding effect is sequentially overcome at succeeding regions designated as A–R along the selector wire 12 since the peak positive magnetizing effect of the control winding inputs moves along the selector wire 12 to succeeding regions thereof as set forth below.

The following mathematical analysis illustrates how the peak magnetizing effect moves along the selector wire 12 at a uniform rate when the control winding densities vary along the selector wire as a series of sine and cosine functions and the control windings are energized by respective sine and cosine alternating currents.

The turns densities of the pair 70 of windings 73 and 74 are functions of the distance X along the length L of the selector wire. The turns density of winding 73 being equal to $$K' \sin\frac{2\pi X}{L}$$

and the turns density of winding 74 being equal $$K' \cos\frac{2\pi X}{L}$$

With windings 73 and 74, the magnetizing force H at a distance X along the selector wire is equal to $$\left(I_{73}K' \sin\frac{2\pi X}{L}+I_{74}K' \cos\frac{2\pi X}{L}\right)$$

and, since the input to winding 73 is equal to $K \sin 2\pi ft$ and the input to winding 74 is equal to $K \cos 2\pi ft$, H is a function of both X and $t$ and $$H=\left[K \cos(2\pi ft)K' \cos\left(\frac{2\pi K}{L}\right)+ K \sin(2\pi ft)K' \sin\left(\frac{2\pi X}{L}\right)\right]$$

By trigonometric identity, $\cos(u-v=\cos u \cos v+\sin u \sin v$ and thus $$H=KK' \cos\left(\frac{2\pi X}{L}-2\pi ft\right)=KK' \cos 2\pi\left(\frac{X}{L}-ft\right)$$

Since $\cos\theta$ is maximum when $\theta=0$, the maximum $H=KK'$ occurs when $$2\pi\left(\frac{X}{L}-ft\right)=0$$

and therefore the maximum H occurs at any point $X=Lft$ or at any time $$t=\frac{X}{fL}$$

Thus, the maximum magnetizing force $H=KK'$ moves along the selector wire 12 at a constant rate when the frequency $f$ is constant.

When additional sine and cosine winding pairs 71 and 72 are added wherein the turns densities are $$K' \sin 2\pi(3^{N-1})\frac{X}{L} \text{ and } K' \cos 2\pi(3^{N-1})\frac{X}{L}$$

and the inputs are $K \sin 2\pi(3^{N-1})ft$ and $K \cos 2\pi(3^{N-1})ft$, the magnetizing force $$H=\sum_{N=1,2,\ldots} KK' \cos 2\pi(3^{N-1})\left(\frac{X}{L}-ft\right)$$

and the maximum $H=NKK'$ occurs when $$2\pi(3^{N-1})\left(\frac{X}{L}-ft\right)=0$$

Thus the maximum H still occurs when $X=Lft$ and $$t=\frac{X}{Lf}$$

However, when more windings and inputs are added, the peak H becomes sharper, narrower, and higher.

The spacing of the various regions along the selector wire 12 equals $$\frac{\frac{1}{2}L}{(3^{N-1})}$$

and, with the three illustrated control windings, eighteen regions are provided wherein eighteen ANDAPs may be stored. Additional regions may be provided by adding additional pairs of sinusoidal control windings and, for each additional pair, the number of regions and thus the number of ANDAPs that may be stored is tripled.

In should be noted that the above-described recorder is not limited to utilization in producing composite intelligence signals and synthesizing sounds or human speech, but may be readily adapted for utilization in conjunction with TV transmission or any reading out operations wherein ANDAPs are to be read out in a desired order.

In TV transmission, a pair of recorder wires long enough for recording the data contained on a line of an image producing TV tube would be associated with each line thereof. Initially, the information derived by an exploring beam of such a tube in scanning the first line of the raster would be recorded in the first one of the recorder wires and would thereafter be read out and transmitted to the receiver location to modulate a reproducing beam while it scans the first line of the associated raster on the viewing screen of a receiving TV tube so as to re-construct the previously recorded and corresponding first line portion of the original image. Subsequently, any changes in the image producing line would be recorded in the second one of the recorder wires along with the unchanged data from the first one of the recorder wires and the changes would be transmitted to the associated line of the receiver TV tube. With this system, the required channel width may be narrowed as subsequent to the transmission of a complete frame of picture information only the changes need be transmitted. This, of course, assumes that the receiver screen exhibits sufficient persistence to retain the re-constructed image on the screen between successively transmitted pictures differing materially in signal content. Accordingly, it is not necessary to transmit information associated with a given line only once each frame, but rather, it is possible to transmit a series of amplitudes, for example, each giving information about two or more picture elements or lines so that the channel band width required could be reduced by as much as one-half that needed for normal transmission. If such signal information is transmitted over the narrow channel, the picture on the TV tube is distorted initially since the channel is not wide enough to transmit sufficient signal information to reproduce the original image, but the picture clears in several frames as the recorder system adjusts itself.

While certain specific embodiments of the invention have been described in detail, it will be obvious that various modifications may be made from the specific details described without departing from the spirit and scope of the invention.

What is claimed is:

1. Apparatus for selectively reading out data which have been stored in a stationary magnetic recorder wire in spaced discrete sections along the length thereof, which comprises a single pickup winding wound about the recorder wire along the length thereof; input winding means wound about the recorder wire to form a succession of independent, interconnected input windings periodically spaced along the length thereof, each input winding being electromagnetically coupled with the recorder wire at a corresponding one of the spaced sections therealong wherein data is stored; and means for inducing a current pulse in any selected one of the input windings of sufficient amplitude to induce a localized magnetic flux change pulse in the recorder wire at the corresponding section therealong wherein data is stored so that an output pulse representative of the selected data is electromagnetically induced in the pickup winding, the amplitude of the current pulse being such that the stored data is not significantly altered.

2. Apparatus for selectively reading out data which have been stored in a stationary magnetic recorder wire at spaced discrete sections aong the length thereof, which comprises pickup means wound about the recorder wire; a stationary magnetic selector wire disposed in parallel relationship with respect to the recorder wire; coil means electromagnetically coupling each of the sections along the recorder wire with a corresponding discrete region of said selector wire; and means for inducing a localized magnetic flux change pulse in any selected one of the various regions of the selector wire of sufficient amplitude to induce through said coil means a localized magnetic flux change pulse in the recorder wire at the corresponding section therealong wherein data is stored so that an output pulse representative of the selected data is electromagnetically induced in the pickup means, the amplitude of the flux change pulse in the recorder wire being such that the stored data is not significantly altered.

3. Apparatus for selectively reading out in any desired order data which have been stored in a stationary magnetic recorder wire at spaced independent sections along the length thereof, which comprises a single pickup winding about the recorder wire along the length thereof; a stationary magnetic selector wire disposed in parallel relationship with respect to the recorder wire; input winding means wound about the recorder wire and the selector wire to form a succession of independent, interconnected linking windings periodically spaced along the length of both wires, the linking windings electromagnetically coupling regions of said selector wire with corresponding ones of the sections along the recorder wire so that, when a localized magnetic flux change pulse is induced in a selected region of the selector wire, a current pulse is induced in the associated linking winding which induces a localized magnetic flux change pulse in the recorder wire at the corresponding section, so that an output pulse representative of the selected data is electromagnetically induced in the pickup winding; and means for applying current pulses about the selector wire at any selected region therealong, each current pulse being of sufficient magnitude to induce a localized magnetic flux change pulse in the selected region, the amplitude of the current pulses applied about the selector wire being such that the stored data are not significantly altered, the current pulses being applied about the various regions of the selector wire in a predetermined sequence designed to read out the data in a desired order.

4. Apparatus for inducing localized magnetic flux change pulses in various specific regions along the length of a stationary magnetic wire, which comprises a plurality of electrically independent control windings wound about the wire along the length thereof, each control winding having periodic characteristic variations in the winding pattern which are distinct from but bear a predetermined relationship to the periodic characteristic variations of every other control winding so that each specific region along the length of the wire is defined by a different combination of the winding patterns of the control windings; means for negatively biasing the wire beyond magnetic saturation; and means for applying various predetermined combinations of control signals to the control windings having polarities, frequencies and amplitudes which are determined by the winding patterns and the negative bias so that the cumulative effect of the magnetizing forces produced by all of the individual control windings and associated signals is a maximum in only one specific region of the wire for each specific combination of control signals applied to the control windings, the maximum magnetizing effect being sufficient to drive the wire out of saturation only in that specific region to induce a flux change pulse therein.

5. Apparatus for inducing localized magnetic flux change pulses in various specific regions along the length of a stationary mangetic wire, which comprises a plurality of electrically independent control windings wound about the wire along the length thereof, each control winding having periodic reversals in the direction of winding, the winding directions and reversal intervals of the various control windings varying in accordance with a binary winding pattern such that a first control winding is provided with a reversal interval which defines the specific regions along the wire and such that each subsequent control winding is provided with a reversal interval which is double that of the next preceding control winding; means for negatively biasing the wire beyond magnetic saturation so that each specific region along the wire is driven out of saturation and has a magnetic flux change pulse of significant magnitude induced therein only when the portions of all the control windings associated with this region are simultaneously positive in sense, each control winding being positive in sense either (1) when a positive signal is applied thereto and the associated portion thereof is of a first winding pattern or (2) when a negative signal is applied thereto and the associated portion thereof is of a reverse winding pattern; and means for applying either of two control signals to each of the control windings, the control signals being equal in amplitude and opposite in polarity, whereby one specific region of the wire is driven out of saturation for each possible combination of positive and negative signals applied to the control windings so that a flux change pulse is induced in that region of the wire.

6. Apparatus for inducing localized magnetic flux change pulses in various specific regions along the length of a stationary magnetic wire, which comprises a plurality of pairs of control windings wound about the wire along the length thereof, each control winding having periodic reversals in the direction of winding, the winding directions and the reversal intervals of the various control windings varying in accordance with a sinusodial winding pattern such that a first pair of control windings is provided with a reversal interval that corresponds with one-half the length of the wire and such that each subsequent pair of control windings is provided with a reversal interval which is one-third that of the next preceding pair of control windings, a cosine control winding being included in each pair having a turns density of $$K' \cos 2\pi(3^{N-1})\frac{X}{L}$$

and a sine control winding being included in each pair having a turns density of $$K' \sin 2\pi(3^{N-1})\frac{X}{L}$$

wherein K′ is a constant, N is the number of the particular pair of control windings, X is the distance along the wire, and L is the total length of the wire; a bias winding wound about the wire which has a turns density of K′; means for applying a biasing signal to the bias winding to negatively bias the wire beyond magnetic saturation; and means for applying control signals equal to $K \cos 2\pi(3^{N-1})ft$ to the cosine control windings and for applying control signals equal to $K \sin 2\pi(3^{N-1})ft$ to the sine control windings, wherein K is a constant, $f$ is the frequency and $t$ is the time, so that the bias is overcome at succeeding sections along the wire and a flux change pulse is induced in the wire at the succeeding sections therealong.

7. Apparatus for selectively storing data in a magnetic recorder wire at spaced discrete sections along the length thereof, which comprises a magnetic selector wire disposed in fixed parallel relationship with respect to the recorder wire; first coil means electromagnetically coupling each of the sections of the recorder wire with a corresponding discrete region of said selector wire; and second coil means associated with said selector wire and selectively energizable by a current pulse to induce a localized magnetic flux pulse in any selected one of the discrete regions of the selector wire thereby to induce a current pulse in a corresponding portion of said first coil means and to induce a localized magnetic flux pulse in the recorder wire at the corresponding section thereof.

8. Apparatus for selectively storing data in a magnetic recorder wire at spaced discrete sections along the length thereof, which comprises a magnetic selector wire disposed in fixed parallel relationship with respect to the recorder wire; first coil means electromagnetically coupling each of the sections of the recorder wire with a corresponding discrete region of said selector wire; second coil means associated with said selector wire and selectively energizable by an input current pulse to induce a localized magnetic flux pulse in any selected one of the discrete regions of the selector wire and thereby to induce in said first coil means a leading pulse corresponding to the leading edge of the input current pulse and a trailing pulse corresponding to the trailing edge of the input pulse; and a bias winding associated with the recorder wire and energizable to apply a magnetizing force to the recorder wire which is at least of the same order of magnitude as the magnetizing force of the current pulses induced in said first coil means, whereby only one of the leading and trailing pulses adds to the magnetizing force of said bias winding and alters the magnetic condition of a section of the recorder wire while the other of the leading and trailing pulses is substantially offset by the effect of said bias winding.

9. Apparatus for selectively storing data in a magnetic recorder wire at spaced discrete sections along the length thereof, which comprises a magnetic selector wire disposed in fixed parallel relationship with respect to the recorder wire; first coil means electromagnetically coupling each of the sections of the recorder wire with a corresponding discrete region of said selector wire; second coil means magnetically coupled with said selector wire and selectively energizable by current pulses to induce localized magnetic flux pulses in any selected ones of the discrete regions of the selector wire thereby to induce through said first coil means localized magnetic flux pulses in the recorder wire at the corresponding sections thereof, said second coil means including a plurality of electrically independent coils traversing the various regions of said selector wire, said coils being selectively reversed with respect to the direction of their magnetic coupling with said selector wire after traversing successive regions such that each region is magnetically coupled with coil portions having a different combination of directions of magnetic coupling therewith, whereby simultaneous energization of said coils by current pulses of selected polarities produces maximum magnetizing force in only one selected region of said selector wire; and third coil means associated with said selector wire and energizable to apply magnetizing force to said selector wire beyond the point of saturation thereof, whereby only the maximum magnetizing force produced by said second coil means is sufficient to bring a region of said selector wire out of saturation and to induce a significant current in said first coil means.

10. Apparatus for selectively storing data in a magnetic recorder wire at spaced discrete sections along the length thereof and for selectively reading out data in any desired order, which comprises a magnetic selector wire disposed in fixed parallel relationship with respect to the recorder wire; first coil means electromagnetically coupling each of the sections of the recorder wire with a corresponding discrete region of said selector wire; second coil means associated with said selector wire and selectively energizable by a current pulse to induce a localized magnetic flux pulse in any selected one of the discrete regions of the selector wire thereby to induce through said first coil means a localized magnetic flux pulse in the recorder wire at the corresponding section thereof; and a single pickup winding wound about the recorder wire along the length thereof, said pickup winding having a current pulse induced therein in response to selective energization of said second coil means, with said current pulse having a magnitude representative of the data stored in the section of the recorder wire electrically responsive to the selective energization by said second coil means.

11. Apparatus for selectively storing data in a magnetic recorder wire at spaced discrete sections along the length thereof and for selectively reading out data in any desired order, which comprises a magnetic selector wire disposed in fixed parallel relationship with respect to the recorder wire; first coil means electromagnetically coupling each of the sections of the recorder wire with a corresponding discrete region of said selector wire; second coil means magnetically coupled with said selector wire and selectively energizable by current pulses to induce localized magnetic flux pulses in any selected ones of the discrete regions of the selector wire thereby to induce through said first coil means localized magnetic flux pulses in the recorder wire at the corresponding sections thereof, said second coil means including a plurality of electrically independent coils traversing the various regions of said selector wire, said coils being selectively reversed with respect to the direction of their magnetic coupling with said selector wire after traversing successive regions such that each region is magnetically coupled with coil portions having a different combination of directions of magnetic coupling therewith, whereby simultaneous energization of said coils by current pulses of selected polarities produces maximum magnetizing force in only one selected region of said selector wire; third coil means associated with said selector wire and energizable to apply magnetizing force to said selector wire beyond the point of saturation thereof, whereby only the maximum magnetizing force produced by said second coil means is sufficient to bring a region of said selector wire out of saturation and to induce a significant current in said first coil means; and a single pickup winding wound about the recorder wire along the length thereof; said pickup winding having a current pulse induced therein in response to selective energization of said second coil means, with said current pulse having a magnitude representative of the data stored in the section of the recorder wire electrically responsive to selective energization by said second coil means.

12. Apparatus for selectively storing data in a magnetic recorder wire at spaced discrete sections along the length thereof, which comprises a magnetic selector wire disposed in fixed parallel relationship with respect to the recorder wire; first coil means electromagnetically coupling each of the sections of the recorder wire with a corresponding discrete region of said selector wire; second coil means associated with said selector wire and selectively energizable by a current pulse to induce a localized magnetic flux pulse in any selected one of the discrete regions of the selector wire thereby to induce a current pulse in a corresponding portion of said first coil means and to induce a localized magnetic flux pulse in the recorder wire at the corresponding section thereof; and third coil means being associated with said selector wire and being energizable to apply a magnetizing force to said selector wire beyond the point of magnetic saturation thereof, whereby a current pulse in said second coil means of a predetermined magnitude, less than sufficient to bring the selected region of said selector wire out of saturation, is insufficient to induce a significant current in said first coil means.

References Cited by the Examiner

UNITED STATES PATENTS

| | | | |
|---|---|---|---|
| 3,031,648 | 4/62 | Haber et al. | 340—174 |
| 3,067,408 | 12/62 | Barrett | 340—174 |

FOREIGN PATENTS

| | | |
|---|---|---|
| 229,409 | 7/60 | Australia. |

OTHER REFERENCES

"The Bell System Technical Journal," November 1957, vol. 36, No. 6, pages 1319–1340.

ROBERT H. ROSE, *Primary Examiner.*